UNITED STATES PATENT OFFICE.

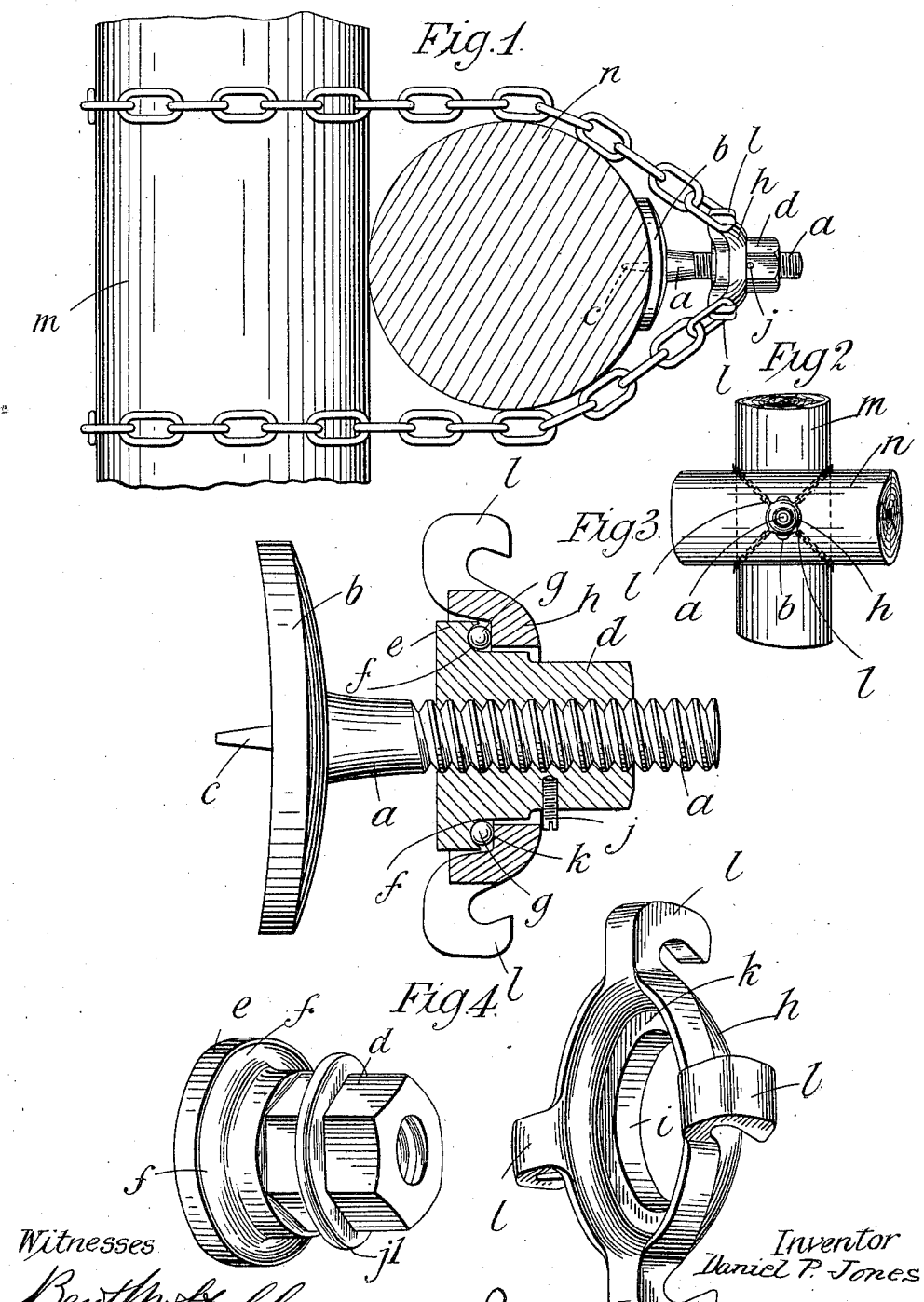

DANIEL PALMER JONES, OF WESTMINSTER, LONDON, ENGLAND, ASSIGNOR TO THE PATENT RAPID SCAFFOLD TIE COMPANY LIMITED, OF LONDON, ENGLAND.

CONNECTING TOGETHER SCAFFOLDING-POLES.

998,776.          Specification of Letters Patent.      Patented July 25, 1911.

Application filed July 22, 1910. Serial No. 573,209.

*To all whom it may concern:*

Be it known that I, DANIEL P. JONES, subject of the King of Great Britain, resident of Westminster, county of London, England, have invented certain new and useful Improvements in Connecting Together Scaffolding-Poles, of which the following is a specification.

This invention has for its object a device for binding or connecting together scaffold poles and the like and more particularly the construction of a so-called scaffold tie with the aid of which it is possible to supersede the application of ropes as hitherto used for this purpose and to enable a scaffold to be erected in a very much quicker and safer manner than has up to the present been possible with the aid of ropes or similar tying means. The ties of a similar nature and at present in use in connection with scaffolding usually consist of a so-called tension plate adapted to receive the ends of the tying medium and arranged to be displaced by means of a screw or the like so as to stretch the tying medium such as chains or ropes and to hold them stretched around the poles and thereby to hold the poles in an assembled position. In a tie of this kind, however, the tension plate is as a rule so arranged on the screw or nut by which it is to be moved that owing to the friction prevailing between the screw and the tension plate the latter tends to rotate with the screw. This has the inconvenience that the chains or other means used for the connection of the poles, on being loosely hung on to the projections or hooks of the tension plate, are caused to slip off as soon as the screw is rotated whereby the handling of a tie of this kind cannot always be effected as quickly as would be desirable.

Now the tie according to the present invention is so constructed as to obviate the above drawback and to this end the tension plate is arranged on the screw nut, by which it is to be displaced in a rectilinear manner with as little friction as possible so as to prevent it from rotating when the nut is rotated to stretch the binding or tying medium. This object is attained by constructing the nut on which the tension plate is supported with an appropriate enlargement or flange and constructing the tension plate with a shoulder or race within it and interposing between the said enlargement or flange of the nut and the race of the tension plate an anti-friction device such as a metallic rust proof bushing or ball bearing or the like thereby enabling the tension plate to be quite independent of the rotary movement of the nut, while at the same time so arranging it as to cause its rectilinear displacement during the rotation of the nut in one or the other direction.

In order that this invention may be more fully understood reference is made to the accompanying drawing in which:—

Figure 1 represents, on a reduced scale, a lateral view of the scaffold tie according to this invention as applied to a vertical and horizontal scaffold pole. Fig. 2 shows a front view of Fig. 1 on a still more reduced scale. Fig. 3 is an axial section of the scaffold tie which is represented at practically one half natural size and Fig. 4 illustrates a perspective view of the nut and the tension plate respectively.

As shown in Fig. 3 the device consists of a screw bolt $a$ provided with an enlarged foot portion or plate $b$ which may be of any desired shape and size; but by preference is formed with a curved base adapted to fit the surface of the ordinary scaffolding pole and provided with a spur or central projection $c$ which as shown in Fig. 1 is driven into the respective poles when the tie is to be fixed thereto. Adapted to revolve on this bolt $a$ is a nut $d$ which preferably is of the ordinary hexagonal shape so as to enable the application thereto of an ordinary wrench or other appropriate tool. The base of this nut, according to this invention, is enlarged or provided with a flange $e$ which forms a support or shoulder. As shown an annular groove $f$ of semi-circular or other cross section is arranged in the flange $e$ so as to provide a cavity for the arrangement of an appropriate anti-friction device as will be presently described. Loosely fitted around the nut $d$ is a plate $h$ hereinbefore called the tension plate. This tension plate may be of any desired shape, but in the preferred construction according to this invention it has the form of a flat shell, in the interior of which a race $k$ is provided so that when the tension plate is applied to the nut the race $k$ lies exactly opposite the grooved shoulder of the flange $e$ of the nut $d$. Thus when the tension plate is in its position on the nut $d$ a cavity is provided between the race $k$ and the groove $f$ as clearly shown in the drawing. Inserted in this cavity is an anti-friction device which may be either a smooth rust proof metal ring or bushing such as brass or the like or as in the example shown have the form of ball bearings $g$ thereby enabling the tension plate $h$ to rotate freely and without friction on the nut $d$. In order to prevent the tension plate $h$ from being displaced relatively to the nut in axial direction a pin or screw plug $j$ as indicated in Fig. 3 is introduced into the body of the nut $d$ after the tension plate has been placed in position or the nut may for this purpose be provided with a stop collar $j'$ formed integral with the nut as shown in Fig. 4, or sprung on to the same after the application of the tension plate, so as to center the latter as will be readily understood.

The tension plate $h$ is provided with two or several hooks or hook shaped projections $l$ adapted to receive the ends of the tying medium such as for instance the links of chains or the loops of ropes or the like if the latter are used. For the connection of vertical and horizontal poles for scaffolding purposes the tension plate is by preference provided with four hooks arranged at right angles and diametrically opposite to each other as shown in the drawing.

Now in illustrating the construction and operation of the device attention is drawn to Figs. 1 and 2 of the drawing where a horizontally placed scaffold pole $n$ is to be connected to and supported by a vertical scaffold pole $m$ and in such an example it is convenient, in order to support the horizontal pole $n$ while the tie is applied, to employ any appropriate means such as a temporary supporting bracket which for the time being is driven or otherwise attached to the vertical pole $m$ in order to temporarily hold the horizontal pole in position. The scaffold tie according to this invention is then applied, it being fitted in the present instance to carry two chains, the ends of which are to be applied to the four hooks on the tension plate $h$. The tie having been placed in position against the pole $m$ a slight blow is given by means of a hammer or the like to the bolt $a$ in axial direction so as to drive the spur $c$ into the pole $n$. The chains are now passed around the vertical pole $m$ to which the horizontal pole is to be connected and the links of the lower chain are hooked on to the lower hooks $l$ of the tension plate $h$ and similarly the links of the upper chain are hooked on to the other hooks of the tension plate. This having been done the nut $d$ is rotated by means, for instance of a key or spanner, in counter-clockwise direction and the tension plate $h$ is thus drawn away from the foot plate $b$ in order to stretch the chains to any desired extent and thereby to bind the poles $m$ and $n$ firmly together. In using two chains as described it will be seen from an inspection of Fig. 2 that on the tension plate $h$ being moved away from the pole to the desired extent the two chains are equally divided into four components acting from one common point which is located in the center of the bolt $a$ whereby a uniform grip is obtained on the poles and a very secure and safe connection of the same is effected.

A scaffold tie of this kind is perfectly easy to apply and can be effectively employed without special skill. Moreover it can be adjusted from time to time as found desirable, with absolute certainty and security and when the parts of the structure are to be dismembered it can be removed by simply loosening or letting back the tension plate and is in a condition to be again used in the erection of other structures as will be readily understood. The interposition of the anti-friction device between the nut and the tension plate has the great advantage of enabling the tension plate to give, in the event of torsional forces occurring on the part of the chains, without causing counter-rotation of the nut, and where ball bearings are used the additional advantage is obtained of having the tension plate precisely centered while axial strains or thrusts are entirely taken up by the balls whereby the other parts of the tie are correspondingly relieved from strains.

It will be observed that the plate $h$ has a projecting skirt or flange reaching over the flange $e$ of the nut, and it is under this skirt that the anti-friction balls are located. Furthermore, it will be observed that the hooks $l$ extend from this depending or projecting skirt, and by reason of this it is possible to form the hook of proper size and yet to keep the outer end of the hook below the plane or in rear of the plane of the outer face of the plate $h$, so that the portion of the nut $d$ which is adapted to receive the wrench is left fully exposed.

What I claim and desire to secure by Letters Patent is—

A device for connecting scaffold poles comprising a foot plate adapted to fit the pole, a screw bolt extending therefrom, a nut having a flange, a tension plate adapted to fit loosely over the nut, interposed anti-friction devices between the nut and plate, said plate having a skirt extending inwardly and rearwardly to protect the anti-friction means and hooks extending from said skirt and below the plane of the outer face of the plate, substantially as and for the purpose set forth.

In testimony, that I claim the foregoing as my invention, I have signed my name in presence of two subscribing witnesses.

DANIEL PALMER JONES.

Witnesses:
JUSTUS E. POLLAK,
WALKER H. DERRIMAN.